(12) United States Patent
Kadel et al.

(10) Patent No.: US 11,373,142 B1
(45) Date of Patent: Jun. 28, 2022

(54) METHOD FOR PROCESSING DATA OF DISTRIBUTED COORDINATION SYSTEM AND ELECTRONIC APPARATUS THEREFOR

(71) Applicant: Coupang Corp., Seoul (KR)

(72) Inventors: Prakash Kadel, Seoul (KR); Du Hyeong Kim, Seoul (KR); Ki Woong Jang, Seoul (KR)

(73) Assignee: Coupang Corp., Seoul (KR)

(*) Notice: Subject to any disclaimer, the term of this patent is extended or adjusted under 35 U.S.C. 154(b) by 0 days.

(21) Appl. No.: 17/236,903

(22) Filed: Apr. 21, 2021

(30) Foreign Application Priority Data

Mar. 19, 2021 (KR) .................. 10-2021-0036127

(51) Int. Cl.
  *G06Q 30/00* (2012.01)
  *G06Q 10/08* (2012.01)
  *G06F 16/23* (2019.01)

(52) U.S. Cl.
  CPC .......... *G06Q 10/087* (2013.01); *G06F 16/23* (2019.01)

(58) Field of Classification Search
  CPC ......... G06K 19/07718; G06K 19/0776; G06K 19/07773
  See application file for complete search history.

(56) References Cited

U.S. PATENT DOCUMENTS

| 2016/0275161 A1* | 9/2016 | Tylik .................. G06F 16/273 |
| 2018/0159731 A1 | 6/2018 | Murthy |
| 2020/0327113 A1 | 10/2020 | Patiejunas et al. |

FOREIGN PATENT DOCUMENTS

| CN | 111884834 A | 11/2020 |
| JP | 2012-053534 A | 3/2012 |
| KR | 10-2016-0057944 A | 5/2016 |
| KR | 10-2018-0010733 A | 1/2018 |
| KR | 10-2082355 B1 | 2/2020 |
| KR | 10-2020-0072128 A | 6/2020 |

OTHER PUBLICATIONS

Ho-Young et al., "Shared Data Synchronization and Change Notification between A-SMGCS System Node", 2015 Fall Academic Presentation Contest.

* cited by examiner

*Primary Examiner* — Jamara A Franklin
(74) *Attorney, Agent, or Firm* — Knobbe, Martens, Olson & Bear, LLP

(57) ABSTRACT

Disclosed is a method in which an application server of a distributed system provides data, the method including performing event watching on a ZooKeeper server, receiving information related to a change of a first field included in first data from the ZooKeeper server according to a result of the event watching, reading the first data from a first storage when a request signal for the first data is input from a client, and changing a value of the first field included in the read first data on the basis of the information received from the ZooKeeper server and providing the first data with the changed value of the first field to the client.

9 Claims, 8 Drawing Sheets

METHOD FOR PROCESSING DATA OF DISTRIBUTED COORDINATION SYSTEM AND ELECTRONIC APPARATUS THEREFOR

BACKGROUND

Technical Field

The present disclosure relates to a data processing method of a distributed system and an electronic apparatus therefor.

Description of the Related Art

As the need to use large amounts of data in different applications increases, the demand for distributed systems has been increasing in recent years. A distributed system refers to a system that divides a complex process that has been performed by one high-performance device into small units and that allows a plurality of devices connected over a network to execute the process in a distributed manner. A distributed system has improved system throughput by a plurality of devices processing one task in parallel. Also, a distributed system can be easily expanded by adding a new device to a network.

Related art document: Korean Patent No. 10-2082355

Meanwhile, a distributed coordinator plays a role of maintaining important state information, setting information, or the like in a distributed system. ZooKeeper, which is an example of the distributed coordinator, may perform information sharing between devices, event processing, device monitoring, failure situation determination, and the like in the distributed system. Also, when it is necessary to temporarily change the state of large amounts of data for an application that uses a large amount of data, a specific field should be changed by reading a large amount of data from a database if there is no distributed coordinator, and thus resource consumption may be relatively high. However, in the case of using a distributed coordinator, resource consumption can be reduced, and thus there is a need for a data processing method using the distributed coordinator in the field of producing and managing large amounts of data.

SUMMARY

Technical Goals

Example embodiments disclose a data processing method of a distributed system and an electronic apparatus therefor. However, technical challenges to be achieved by these example embodiments are not limited to the aforementioned technical challenges, and other technical challenges may be inferred from the following example embodiments.

Technical Solutions

According to a first example embodiment, there is provided a method in which an application server of a distributed system provides data, the method including performing event watching on a ZooKeeper server, receiving information related to a change of a first field included in first data from the ZooKeeper server according to a result of the event watching, reading the first data from a first storage when a request signal for the first data is input from a client, and changing a value of the first field included in the read first data on the basis of the information received from the ZooKeeper server and providing the first data with the changed value of the first field to the client.

According to a second example embodiment, there is provided an electronic apparatus for providing data to a distributed system, the electronic apparatus including a memory configured to store at least one instruction and a processor configured to execute the at least one instruction to perform event watching on a ZooKeeper server, receive information related to a change of a first field included in first data from the ZooKeeper server according to a result of the event watching, read the first data from a first storage when a request signal for the first data is input from a client, change a value of the first field included in the read first data on the basis of the information received from the ZooKeeper server, and provide the first data with the changed value of the first field to the client.

According to a third example embodiment, there is provided a computer-readable recording medium including a non-transitory recording medium having a program recorded thereon to cause a computer to execute the above method.

Any other specific details of the example embodiments are included in the detailed description and the accompanying drawings.

Effects

With a method and apparatus of the present disclosure, it is possible to reduce resource consumption when a specific field in a database is changed for an application that uses a large amount of data.

Effects of the present disclosure are not limited to the aforementioned effects, and other effects which are not mentioned here can be clearly understood by those skilled in the art from the appended claims.

DETAILED DESCRIPTION

The terms used herein have been selected as general terms which are widely used at present in consideration of the functions of the present disclosure but may be altered according to the intent of an operator skilled in the art, conventional practice, or introduction of new technology. In addition, specific terms have been arbitrarily selected by the applicant and their meanings will be described in detail in the corresponding sections. Therefore, the terms used herein should be defined on the basis of the overall content of the present disclosure instead of simply the names of the terms.

Throughout the specification, when a part is referred to as including a certain element, this means that the part may include other elements rather than excluding other elements unless otherwise stated. Also, terms such as "-er," "-or," and "module" used herein refer to an element for performing at least one function or operation and may be implemented with hardware, software, or a combination thereof.

An expression "at least one of a, b, and c" used herein may encompass "only a," "only b," "only c," "a and b," "a and c," "b and c," or "all of a, b, and c."

The term "terminal" mentioned below may be implemented as a computer or portable terminal that can access a server or another terminal over a network. Here, a computer may include, for example, a notebook, a desktop, a laptop, and the like which are quipped with a web browser, and a portable terminal may be, for example, a wireless communication apparatus that guarantees portability and mobility and may include any kind of handheld-based wireless communication apparatus such as a terminal, a smartphone, and a tablet PC that are based on communication such as International Mobile Telecommunication (IMT), Code Division Multiple Access (CDMA), W-Code Division Multiple Access (W-CDMA), and Long Term Evolution (LTE).

Hereinafter, example embodiments of the present disclosure will be fully described with reference to the accompanying drawings in such a way that those skilled in the art can easily carry out some example embodiments. The disclosure may, however, be embodied in many different forms and should not be construed as being limited to the example embodiments set forth herein.

Hereinafter, the example embodiments of the present disclosure will be described in detail with reference to the accompanying drawings.

Figure 1:
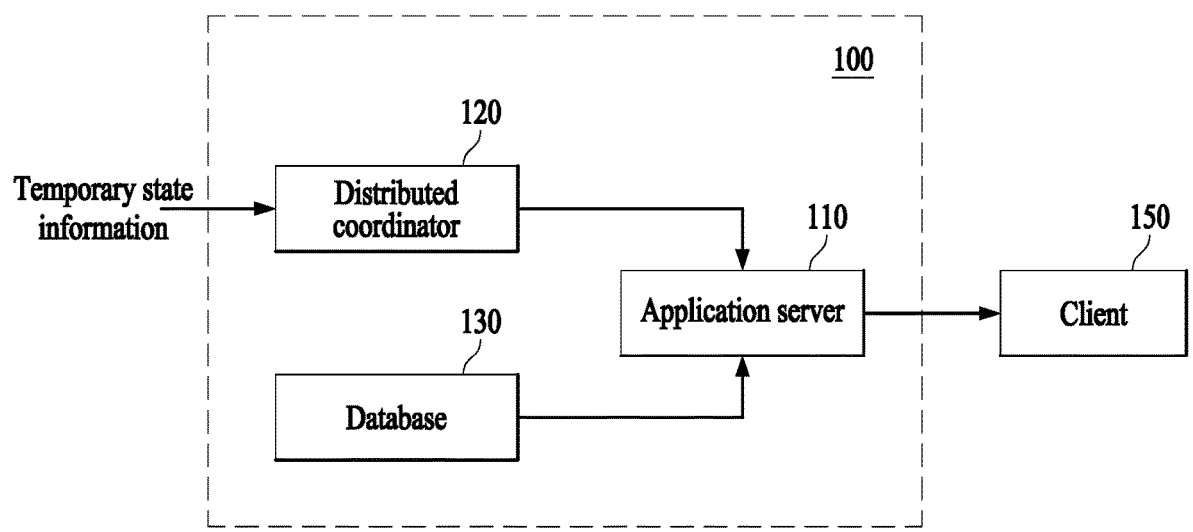
FIGS. 1 and 2 illustrate a distributed system according to some example embodiments.
Figure 2:
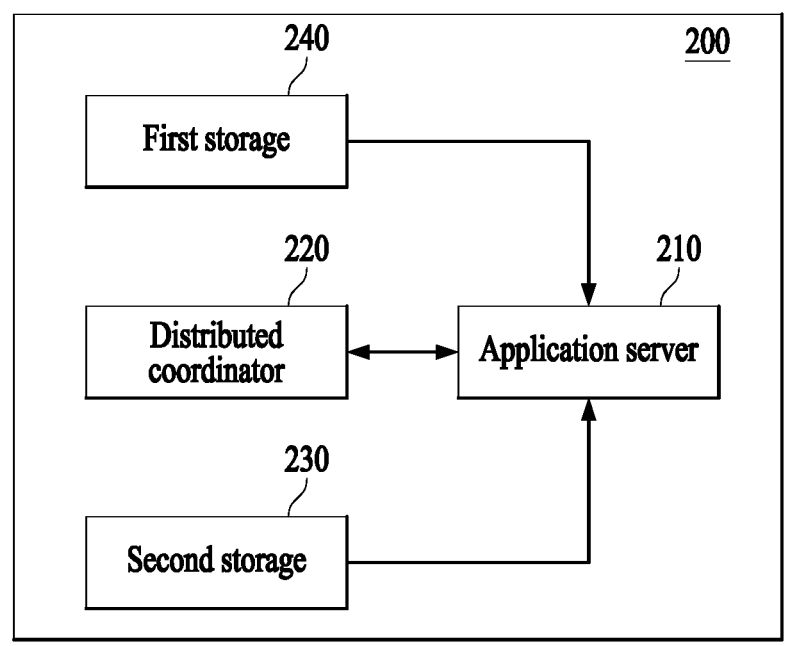

FIGS. 1 and 2 illustrate a distributed system according to some example embodiments.

Referring to FIG. 1, a distributed system 100 according to the present disclosure may include an application server 110, a distributed coordinator 120, and a database 130. Meanwhile, the distributed system 100 of FIG. 1 is shown to include one application server 110, one distributed coordinator 120, and one database 130, but the number of components is not limited thereto.

The application server 110 refers to a server that provides a specific service to a client 150 connected through a network. The application server 110 not only provides a screen displayed on the client 150 but can process various business logics. According to some example embodiments, the application server 110 may be a server that operates an online store, and the client 150 may be a terminal of a user who purchases a product. However, the operating purpose of the application server 110 is not limited thereto. Meanwhile, in the case of the distributed system 100, the application server 110 may perform event watching on the distributed coordinator 120.

The distributed coordinator 120 may check the states of elements included in the distributed system 100 and may allow sharing of data between the elements or perform synchronization between the elements. Since the distributed coordinator 120 is an element for coordinating the distributed system 100, the distributed coordinator 120 may have relatively high data access speed and have an ability to respond to failures that may occur by itself.

The database 130 may store and manage data used in the distributed system 100. Meanwhile, the application server 110 may read data from the database 130 according to a request signal received from the client 150 and provide the read data to the client 150.

For example, when the application server 110 is a server that provides a service related to an online store, the database 130 may store data on products being sold in the online store. In this case, upon receiving a request for information on the stock quantity of a specific product from the client 150, the application server 110 may read the stock quantity of the product from the database 130 and deliver the stock quantity to the client 150.

Meanwhile, a fulfillment center of the online store operated by the application server 110 may be temporarily closed for reasons such as heavy snowfall. Alternatively, it may be difficult to release products from a corresponding fulfillment center due to private problems of employees in the fulfillment center. Then, regardless of data on the stock quantity of a product stored in the database 130, it may be difficult to release the product from the corresponding fulfillment center for a certain period of time.

In this case, according to the method of the present disclosure, a key value of the data on the stock quantity of the corresponding product may be changed to "out of stock" through the distributed coordinator 120 and then provided to the application server 110. Subsequently, the application server 110 may provide information indicating that the product has been sold out to the client 150 according to the key value received from the distributed coordinator 120 even if the application server 110 receives data on the stock quantity of the product from the database 130.

According to the method of the present disclosure, it is possible to provide updated data to the client 150 according to a temporary state of a service provided by the distributed system 100 without changing data stored in the database 130. Therefore, it is possible to reduce resource consumption for changing data in the database 130 and provide the changed data to the client 150 more quickly.

Meanwhile, according to the method of the present disclosure, instead of the distributed coordinator directly storing updated data, a storage for storing updated data may be further included.

Referring to FIG. 2, a distributed system 200 may include an application server 210, a distributed coordinator 220, a first storage 240, and a second storage 230. Meanwhile, the application server 210, the distributed coordinator 220, and the second storage 230 of FIG. 2 correspond to the application server 110, the distributed coordinator 120, and the database 130 of FIG. 1, and thus detailed description thereof will be omitted.

A storage is a storage space capable of storing files of various formats, and a database may be an example of the storage. Meanwhile, the first storage 240 may receive temporary state information of a service. When the distributed system 200 is a system for operating an online store, the temporary state information of the service may include information on temporary closure of a fulfillment center of the online store, information on or regarding products difficult to sell in the online store, and the like, but the temporary state information of the service is not limited thereto.

Meanwhile, referring to FIG. 2, the distributed coordinator 220 may directly receive temporary state information. Also, according to some example embodiments, the first storage 240 may receive and store temporary state information, and the distributed coordinator 220 may store or update access path information for state information stored in the first storage 240.

In this case, when it is ascertained, from the event watching result of the distributed coordinator 220, that the access path information for the state information stored in the first storage 240 has been changed, the application server 210 may receive the changed state information from the first storage 240.

Meanwhile, although the first storage 240 has been described as receiving and storing temporary state information, the temporary state information may be replaced with service-related data.

Figure 3:
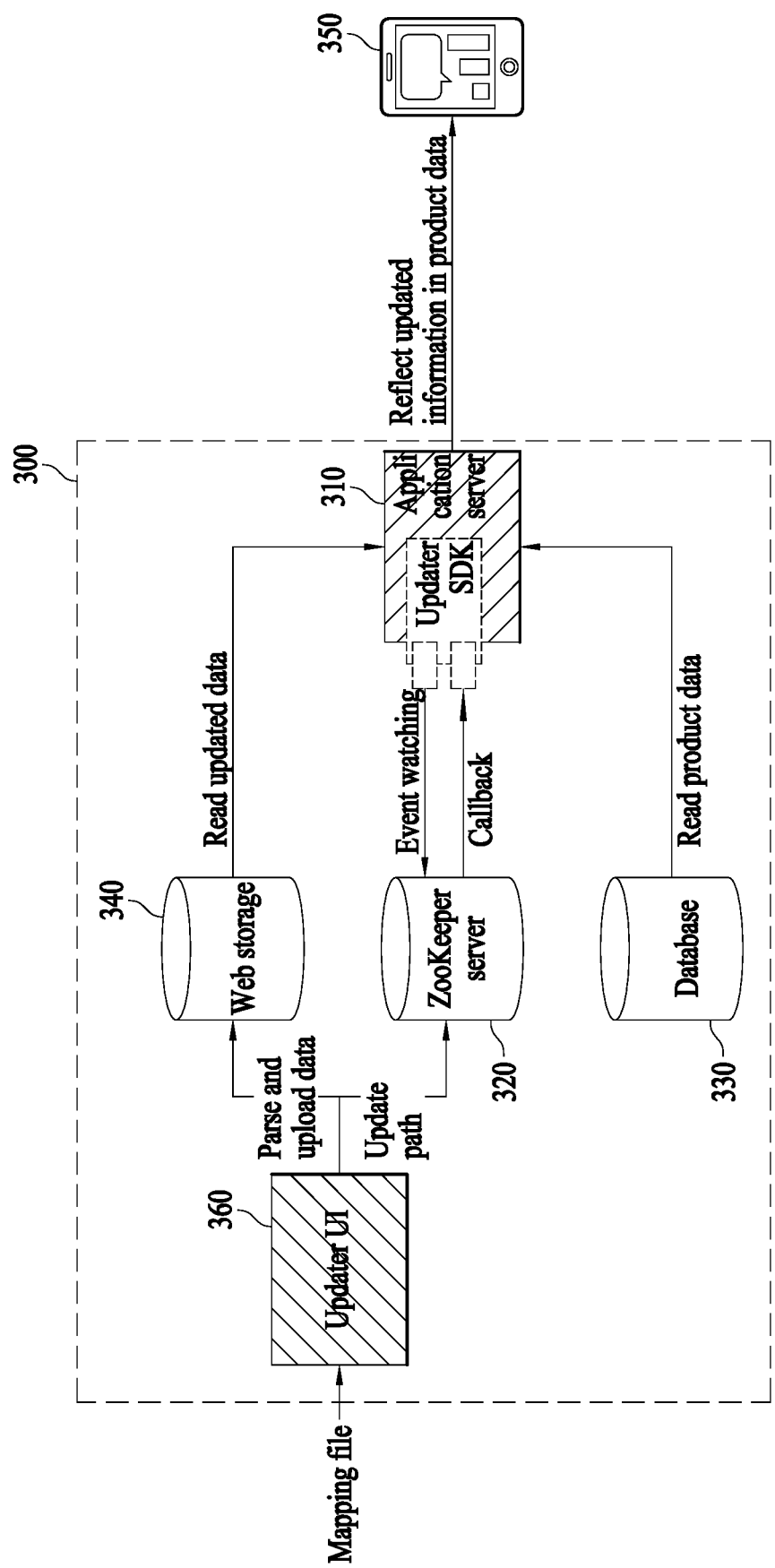
FIG. 3 is a diagram illustrating a distributed system according to some example embodiments.

FIG. 3 is a diagram illustrating a distributed system according to some example embodiments.

Referring to FIG. 3, a distributed system 300 may include an application server 310, a ZooKeeper server 320, a database 330, a web storage 340, and an updater user interface (UI) 360. The application server 310 and the database 330 of FIG. 3 correspond to the application server 110 and the database 130 of FIG. 1, and thus detailed description thereof will be omitted. Meanwhile, the web storage 340 may be an example of the first storage 240 of FIG. 2.

The ZooKeeper server 320 is an example of a distributed system that serves as a distributed coordinator. The ZooKeeper server 320 may provide data storage for sharing data between elements in the distributed system 300, data change notification (Watch) based on element membership management in the distributed system 300, a sequence node used for master and distributed locks, etc. According to the method of the present disclosure, it is obvious to those skilled in the art that an element other than the ZooKeeper server 320 may be included as a distributed coordinator.

Referring to FIG. 3, a system administrator may upload a mapping file through the updater UI 360 and input setting data. Here, the setting data may be defined as information on actions to be taken in case of a temporary change in state. The mapping file and the setting data may be files containing temporary state information and may include, for example, fulfillment center identifiers, camp identifiers, identifiers of items being sold by specific sellers (i.e., seller-items), a duration in which the temporary change in state is maintained, etc. Detailed matters regarding the mapping file and the setting data will be described with reference to FIG. 5.

Meanwhile, the updater UI 360 may parse data contained in an uploaded mapping file and setting data. For example, when a mapping file in an Excel file format is uploaded, the updater UI 360 may parse setting data regarding actions taken due to a change in the temporary state information and data on a fulfillment center identifier included in the setting data and the mapping data and deliver the parsing result to the web storage 340. Also, the updater UI 360 may deliver information on an access path for data stored in the web storage 340 to the ZooKeeper server 320.

Meanwhile, the application server 310 may include an updater software development kit (SDK) to transmit and receive data to and from the ZooKeeper server 320. Also, the application server 310 may perform event watching on the ZooKeeper server 320. When the ZooKeeper server 320 receives the information on the access path for the data stored in the web storage 340 from the updater UI 360, the application server 310 may receive a callback from the ZooKeeper server 320. Also, the application server 310 may read updated data from the web storage 340.

Subsequently, the application server 310 may receive a request for information on the stock quantity of a specific product from the client 350. At this time, the application server 310 may request and receive information on the stock quantity of the product from the database 330 and may transmit the information reflecting the data read from the web storage 340 to the client 350 through a serving layer.

Thus, the client 350 may receive data reflecting the temporary state information of the service.

Figure 4:
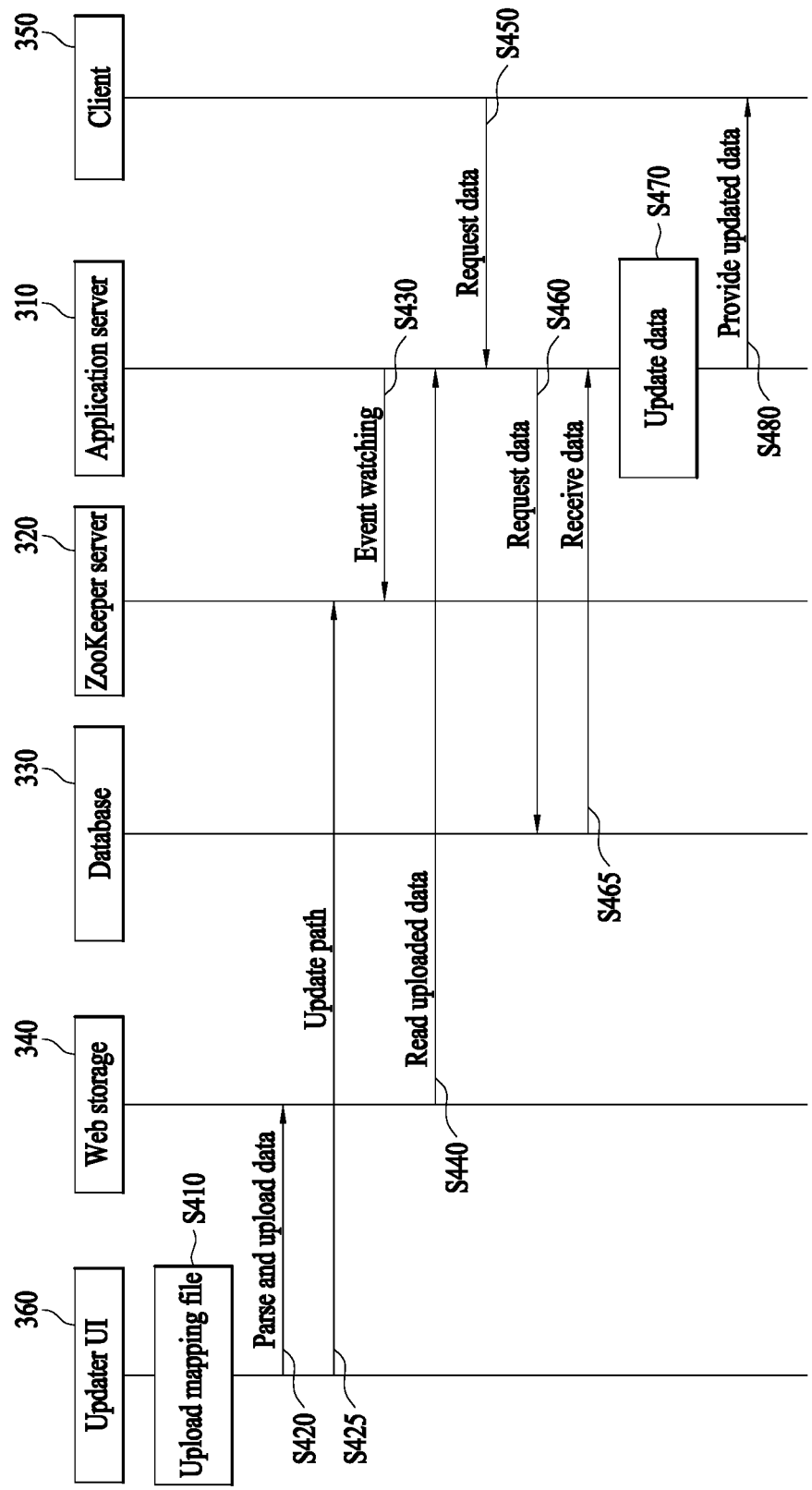
FIG. 4 is a diagram illustrating an example of a method in which an application server of a distributed system provides data according to some example embodiments.

FIG. 4 is a diagram illustrating an example of a method in which an application server of a distributed system provides data according to some example embodiments.

Referring to FIG. 4, in operation S410, an updater UI 360 may upload a mapping file.

In operation S420, the updater UI 360 may parse the mapping file and setting data input through a UI and may upload the parsing result to the web storage 340. Also, in operation S425, the updater UI 360 may transmit update information of a path for the data uploaded to the web storage 340 to the ZooKeeper server 320.

Meanwhile, in operation S430, the application server 310 may perform event watching on the ZooKeeper server 320. Therefore, when the ZooKeeper server 320 receives access path information for updated data, the application server 310 may read the updated data from the web storage 340 in operation S440.

In operation S450, when the client 350 requests data from the application server 310, the application server 310 may deliver the data request to the database 330 in operation S460. Then, in operation S465, the database 330 may transmit the requested data to the application server 310.

In this case, when there is updated data for the data received by the application server 310, the application server 310 may perform data update in operation S470 and may provide the updated data to the client 350 in operation S480.

When the distributed system is for operating an online store, through the above-described procedure, the distributed system may collectively perform data updates such that the number of units that are difficult to ship in a fulfillment center due to temporary reasons is subtracted from the stock quantity of a specific product provided to a client or such that the related product is out of stock and may provide the updated data to the client. Also, according to the method of the present disclosure, it is possible to provide information on changes in some fields of a large amount of data to the client even while the service is provided. Also, according to the method of the present disclosure, through such a data management structure, it is possible to easily update large amounts of data.

Figure 5:
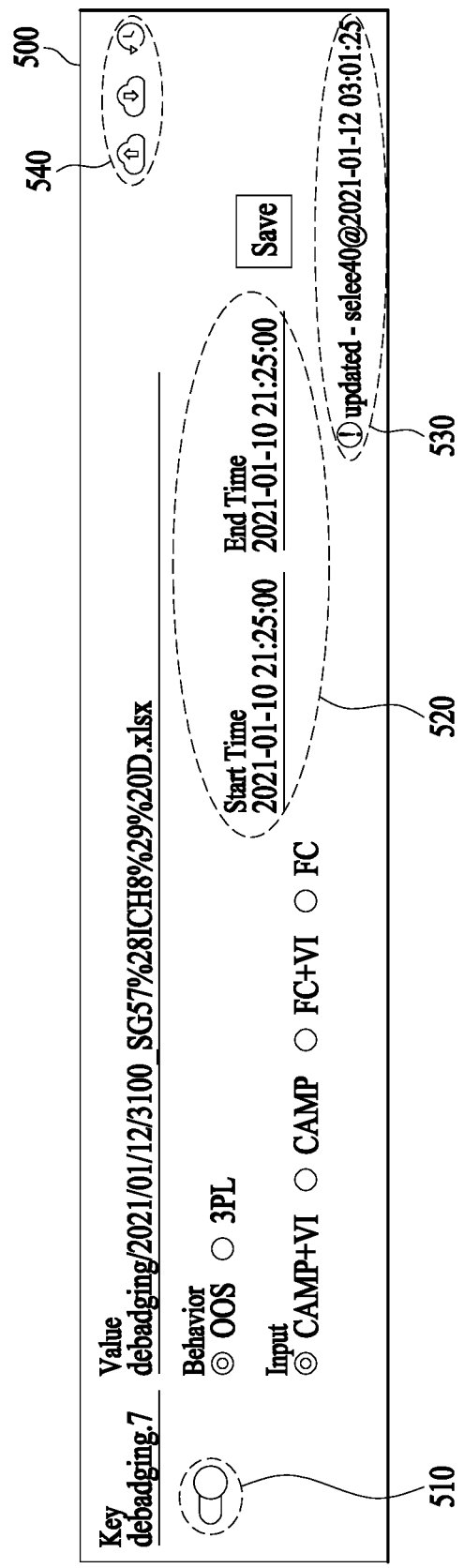
FIG. 5 is a diagram illustrating data input through an updater user interface (UI) according to some example embodiments.

FIG. 5 is a diagram illustrating data input through an updater UI according to some example embodiments.

According to some example embodiments, an updater UI may be used to upload a mapping file and input setting data.

Referring to FIG. 5, a key value (Key: debadging.7) refers to an identifier of a process that is operated independently. For example, information on actions taken when a temporary closure of a fulfillment center occurs may be stored as a single key value. Meanwhile, the number of key values may be, for example, ten, but the present disclosure is not limited thereto.

The value (Value: debadging/2021/01/12/3100_SG57%28ICH8%29%20D.xlsx) is defined as information on a mapping file uploaded from a system administrator. Referring to FIG. 5, it can be seen that the mapping file may be uploaded in the Excel file format. Meanwhile, the mapping file may be obtained by inputting data on a fulfillment center, data on a camp, and data on sellers and items to respective sheets.

The behavior item of FIG. 5 may be an item for receiving a selection for a processing method when it is confirmed that an action input by the system administrator is required. For example, an indication that a corresponding product is out of stock may be provided to a client when OOS is selected, and an indication that a corresponding product is a product shipped by an affiliated carrier even though the product is a retailed product may be provided to a client when 3rd Party Like (3PL) is selected.

Meanwhile, through a first region (switch) 510, the system administrator may determine whether to execute a corresponding action.

A fourth region 540 is a listing of actions that can be performed in the updater UI, and the actions may mean functions of uploading a mapping file, downloading a mapping file, and rolling back to the previous version starting from the left of the region.

An input selection (input of FIG. 5) may be a region for selecting which rule is to be applied among conditions of an uploaded mapping file. Among the data included in the uploaded mapping file, whether to execute a corresponding action may be input according to state information of any combination. Here, the combination may be one of a combination between a camp and seller identifier (CAMP+VI), a camp unit (CAMP unit), a combination between a fulfillment center and a seller identifier (CAMP+VI), and a fulfillment center unit (FC unit).

A second region 520 is a region for selecting or inputting a time range in which a corresponding action is to be performed. Meanwhile, when a time range in which a corresponding action is to be performed is not input to the second region 520 or when switching is performed in the first region 510 such that a corresponding action is to be performed even though it is out of the input time range, the switching result may be prioritized.

Meanwhile, by clicking a storage button, the settings may be stored and applied, and time information related to when the settings are updated and an identifier related to the system administrator that performs the corresponding settings may be displayed through a third region 530.

Meanwhile, it is obvious to those skilled in the art that some items may be deleted from or added to the updater UI according to the system implementation.

Figure 6:
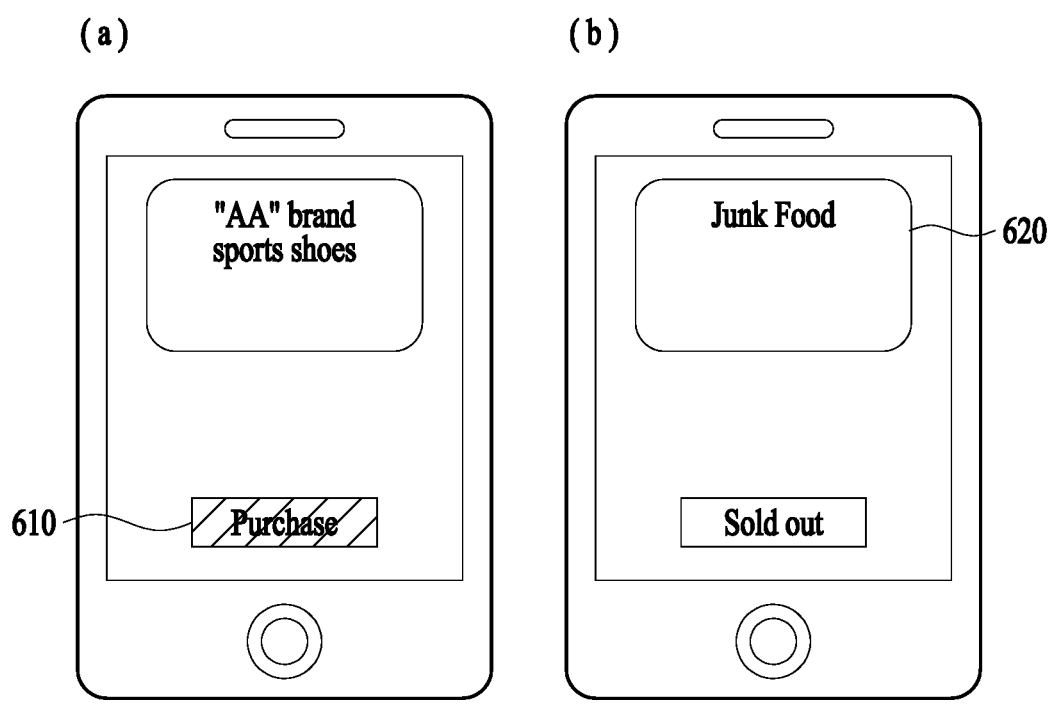
FIG. 6 is a diagram illustrating information provided to a client according to some example embodiments.

FIG. 6 is a diagram illustrating information provided to a client according to some example embodiments.

According to some example embodiments, a fulfillment center "A" ID1 may be temporarily closed due to private reasons such as COVID-19 infection of some workers at the fulfillment center "A" ID1. In this case, when the stock information of sports shoes ID2 that can be sold because there is stock in the fulfillment center "A" is provided to a client, the corresponding sports shoes ID2 of the fulfillment center "A" may be displayed as out of stock. Also, the sports shoes ID2 may be displayed as out of stock only when a client located within a predetermined range from the fulfillment center "A" searches for the sports shoes ID2.

Referring to (a) of FIG. 6, instead of displaying that the sports shoes ID2 is out of stock, a UI provided by a client may be changed such that a purchase button 610 for the sports shoes ID2 cannot be selected. Meanwhile, after work at the fulfillment center A (ID1) is normalized, the client may recover data on the stock of the sports shoes ID2.

Also, referring to (b) of FIG. 6, when a product that the seller intends to sell is a hateful product or an illegal product 620 as well as a problem in the fulfillment center arises, according to the method of the present disclosure, the corresponding product may be quickly displayed as out of stock.

Figure 7:
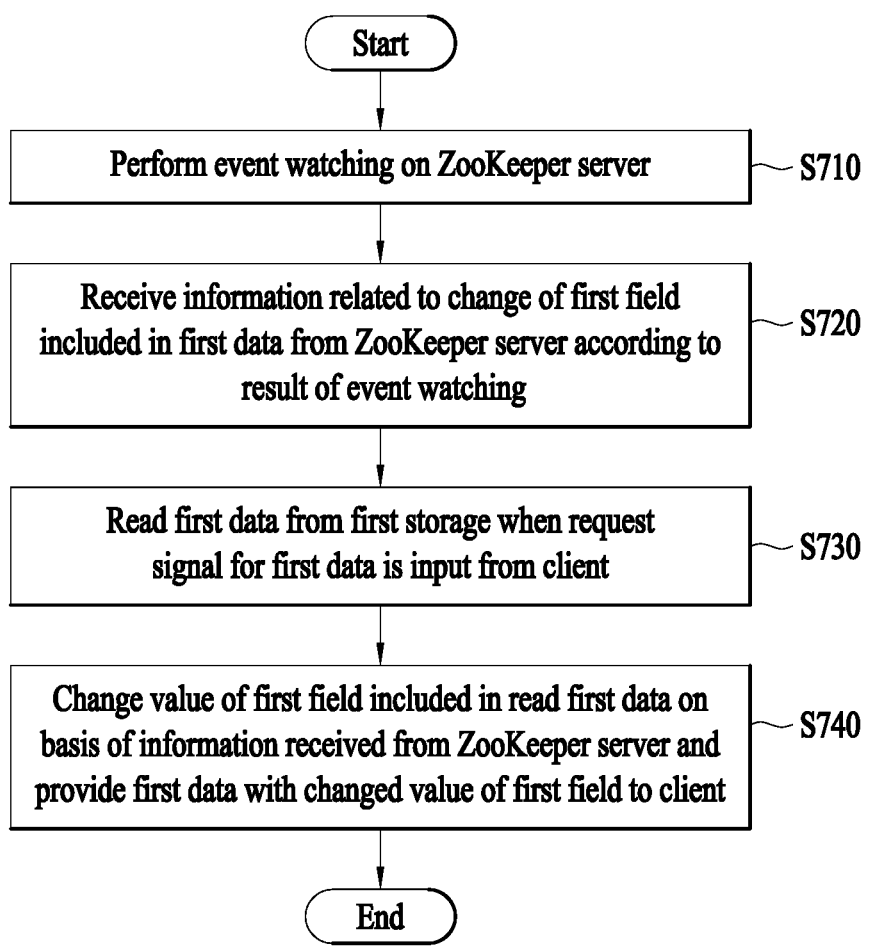
FIG. 7 is a flowchart illustrating a method in which an application server of a distributed system provides data according to some example embodiments.

FIG. 7 is a flowchart illustrating a method in which an application server of a distributed system provides data according to some example embodiments.

In operation S710, the method of the present disclosure may perform event watching on a ZooKeeper server.

In operation S720, the method of the present disclosure may receive information related to a change of a first field included in first data from the ZooKeeper server according to the event watching result. Here, the information related to the change of the first field received from the ZooKeeper server may be access path information for the changed details of the first field which is stored in a second storage. Meanwhile, a first storage is a database, and the second storage is a web storage. Also, the second storage and the ZooKeeper server may receive the changed details of the first field and the access path information for the changed details of the first field from the updater UI, respectively.

Meanwhile, the updater UI may receive at least one of a mapping file and setting data and may parse the changed details of the first field from the received at least one of the mapping file and the setting data and transmit the parsing result to the second storage.

Also, the application server may have an updater SDK to transmit and receive data to and from the ZooKeeper server.

In operation S730, the method of the present disclosure may read the first data from the first storage when a request signal for the first data is input from a client.

In operation S740, the method of the present disclosure may change a value of the first field included in the read first data on the basis of the information received from the ZooKeeper server and provide the first data with the changed value of the first field to the client.

Meanwhile, the application server may be for an online store, the first field may indicate whether a fulfillment center is operable, and the changed value of the first field may be a value indicating the closure of the fulfillment center. In this case, operation S740 may include an operation of checking location information of the client and providing, to the client, an indication that a product needing to be released from the fulfillment center is out of stock when the check result is that the client is located within a predetermined range from the fulfillment center.

When an indication that a product needing to be released from the fulfillment center is out of stock is provided to the client, the method of the present disclosure may further include an operation of receiving information indicating that the value of the first field has been changed to a value indicating the end of the closure of the fulfillment center from the ZooKeeper server as a result of performing event watching on the ZooKeeper server and an operation of providing, to the client, information on the stock quantity of the product needing to be released from the fulfillment center.

Figure 8:
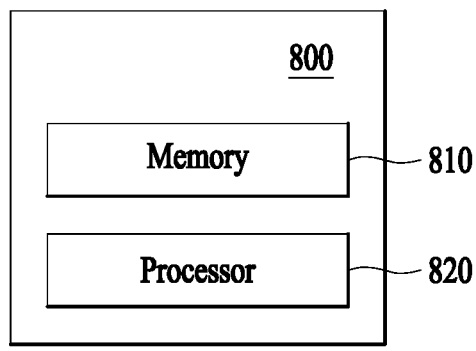
FIG. 8 shows a block diagram of an electronic apparatus according to some example embodiments.

FIG. 8 shows a block diagram of an electronic apparatus according to some example embodiments.

An electronic apparatus 800 of the present disclosure may be an example of an application server of a distributed system. Also, the electronic apparatus 800 may include a memory 810 and a processor 820 according to some example embodiments. In the electronic apparatus 800 shown in FIG. 8, only elements related to some example embodiments are shown. Therefore, it can be understood by those skilled in the art that general-purpose elements other than the elements shown in FIG. 8 may be further included.

The memory 810 is a hardware component configured to store various types of data processed in the electronic apparatus 800. For example, the memory 810 may store data processed and data to be processed by the electronic apparatus 800. The memory 810 may store at least one instruction for operating the processor 820. Also, the memory 810 may store a program, application, or the like to be driven by the electronic apparatus 800. The memory 810 includes random access memory (RAM) such as dynamic random access memory (DRAM) and static random access memory (SRAM), read-only memory (ROM), electrically erasable programmable read-only memory (EEPROM), and CD-ROM, Blu-ray, or other optical disk storages, hard disk drive (HDD), solid state drive (SSD), or flash memory.

The processor 820 may control the overall operation of the electronic apparatus 800 and process data and signals. The processor 820 may control the electronic apparatus 800 as a whole by executing at least one instruction or at least one program stored in the memory 810. The processor 820 may be implemented as a central processing unit (CPU), a graphics processing unit (GPU), an application processor (AP), or the like, but the present disclosure is not thereto.

The processor 820 may perform event watching on a ZooKeeper server and receive information related to the change of the first field included in the first data from the ZooKeeper server according to the event watching result. Also, when a request signal for the first data is input from a client, the processor 820 may read the first data from a first storage, change a value of the first field included in the read first data on the basis of the information received from the ZooKeeper server, and provide the first data with the changed value of the first field to the client.

Here, the information related to the change of the first field received from the ZooKeeper server may be access path information for the change of the first field which is stored in a second storage, the first storage may be a database, and the second storage may be a web storage.

Meanwhile, the second storage and the ZooKeeper server may receive the changed details of the first field and the access path information for the changed details of the first field from an updater UI, respectively. Also, the updater UI may receive at least one of a mapping file and setting data and may parse the changed details of the first field from the received at least one of the mapping file and the setting data and transmit the parsing result to the second storage.

Also, the processor 820 may have an updater SDK to transmit and receive data to and from the ZooKeeper server.

Meanwhile, when the first data with the changed value of the first field is provided to the client, the application server may be for an online store, the first field may indicate whether a fulfillment center is operable, and the changed value of the first field may be a value indicating the closure of the fulfillment center. In this case, the processor 820 may check location information of the client and provide, to the client, an indication that a product needing to be released from the fulfillment center is out of stock or is a product that has to be shipped by an affiliated carrier when the check result is that the client is located within a predetermined range from the fulfillment center.

Also, after an indication that a product needing to be released from the fulfillment center is out of stock or has to be shipped by an affiliated carrier is provided to the client, the processor 820 may receive information indicating that the value of the first field has been changed to a value indicating the end of the closure of the fulfillment center from the ZooKeeper server as a result of the event watching on the ZooKeeper server and may provide, to the client, information on the stock quantity of the product needing to be released from the fulfillment center.

According to some example embodiments, an electronic apparatus or a terminal may include a processor, a memory configured to store and execute program data, a permanent storage such as a disk drive, a communication port configured to communicate with an external apparatus, a user interface device such as a touch panel, a key, and a button, and the like. Methods implemented using software modules or algorithms may be stored on a computer-readable recording medium as computer-readable code or program instructions executable on the processor. Here, the computer-readable recording medium may include a magnetic storage medium (e.g., ROM, RAM, floppy disk, hard disk, etc.), an optical reading medium (e.g., CD-ROM, digital versatile disc (DVD), etc.), and the like. The computer-readable recording medium may be distributed over network-coupled computer systems so that the computer readable code is stored and executed in a distributed fashion. The medium is readable by a computer, stored in a memory, and executed on a processor.

These example embodiments may be described in terms of functional block components and various processing operations. The functional blocks may be realized by various numbers of hardware and/or software components configured to perform specific functions. For example, some example embodiments may employ integrated circuit elements, such as a memory, processing, a logic, and a look-up table, for executing various functions under the control of one or more microprocessors or other control apparatuses. Similar to the elements being executable with software programming or software elements, some example embodiments may be implemented with a programming or scripting language, such as Python, C, C++, Java, and an assembler, including various algorithms implemented with a combination of data structures, processes, routines or other programming elements. Functional aspects may be implemented with an algorithm executed by one or more processors. Furthermore, these example embodiments may employ any number of related art techniques for electronics configuration, signal processing, data processing, and the like. The terms "mechanism," "element," "means," and "configuration" may be widely used and are not limited to mechanical and physical configurations. The terms may include a meaning of a series of routines of software in association with a processor.

The above-described example embodiments are only examples, and other example embodiments may be implemented within the scope of the claims, which will be described below.

What is claimed is:

1. A method for providing data by an application server for an online store of a distributed system, the method comprising:
performing event watching on a coordination server;
receiving information related to a change of a first field included in first data from the coordination server according to a result of the event watching;
reading the first data from a first storage when a request signal for the first data is input from a client; and
changing a value of the first field included in the read first data on the basis of the information received from the coordination server; and
providing the first data with the changed value of the first field to the client, wherein the providing of the first data comprises:
checking location information of the client when the first field indicates whether a fulfillment center is operable, and the changed value of the first field is a value indicating a closure of the fulfillment center; and
providing, to the client, an indication that a product needing to be released from the fulfillment center is out of stock or has to be shipped by an affiliated carrier when the check result is that the client is located within a predetermined range from the fulfillment center.

2. The method of claim 1, wherein the information related to the change of the first field received from the coordination server is access path information for changed details of the first field stored in a second storage.

3. The method of claim 2, wherein the first storage is a database, and the second storage is a web storage.

4. The method of claim 2, wherein the second storage and the coordination server receive the changed details of the first field and the access path information for the changed details of the first field from an updater user interface (UI), respectively.

5. The method of claim 4, wherein the updater UI:
receives at least one of a mapping file or setting data;
parses the changed details of the first field from the received at least one of the mapping file or the setting data; and
transmits result of the parsing to the second storage.

6. The method of claim 1, wherein the application server has an updater software development kit (SDK) to transmit and receive data to and from the coordination server.

7. The method of claim 1, further comprising, after providing an indication that a product needing to be released from the fulfillment center is out of stock or has to be shipped by an affiliated carrier is provided to the client:
receiving information indicating that the value of the first field has been changed to a value indicating the end of the closure of the fulfillment center from the coordination server as a result of the event watching on the coordination server; and
providing, to the client, information on the stock quantity of the product needing to be released from the fulfillment center.

8. A non-transitory computer-readable recording medium having a program recorded thereon for a computer to execute the method of claim 1.

9. An electronic apparatus for providing data by an application server for an online store of a distributed system, the electronic apparatus comprising:
a memory configured to store at least one instruction; and
a processor configured to execute the at least one instruction to:
perform event watching on a coordination server;
receive information related to a change of a first field included in first data from the coordination server according to a result of the event watching;
read the first data from a first storage when a request signal for the first data is input from a client; and
change a value of the first field included in the read first data on the basis of the information received from the coordination server; and
provide the first data with the changed value of the first field to the client, wherein the providing of the first data comprises:
checking location information of the client when the first field indicates whether a fulfillment center is operable, and the changed value of the first field is a value indicating a closure of the fulfillment center; and
providing, to the client, an indication that a product needing to be released from the fulfillment center is out of stock or has to be shipped by an affiliated carrier when the check result is that the client is located within a predetermined range from the fulfillment center.

* * * * *